United States Patent [19]

Wolff et al.

[11] Patent Number: 4,695,974

[45] Date of Patent: Sep. 22, 1987

[54] CIRCUIT ARRANGEMENT FOR RECEIVING AND/OR TRANSMITTING BINARY SIGNALS SERIALLY APPEARING ON THE PLURALITY OF LINES TO AND FROM A PROCESSING DEVICE CONTAINING A MICRO-COMPUTER OR MICROPROCESSOR

[75] Inventors: Pieter Wolff; Hartmut Wedler, both of Munich, Fed. Rep. of Germany

[73] Assignee: Siemens Aktiengesellschaft, Berlin and Munich, Fed. Rep. of Germany

[21] Appl. No.: 740,976

[22] Filed: Jun. 4, 1985

[30] Foreign Application Priority Data

Jun. 4, 1984 [DE] Fed. Rep. of Germany ....... 3420787

[51] Int. Cl.⁴ .................... G11C 7/00; G11C 19/00
[52] U.S. Cl. .................................................. 364/900
[58] Field of Search ... 364/200 MS File, 900 MS File; 307/480; 377/77, 78, 67; 365/233, 239, 240, 219; 340/347 DD; 328/105, 104, 154, 153

[56] References Cited

U.S. PATENT DOCUMENTS 3,573,799  4/1971  Drinnan ............... 340/347 DD
3,703,719  11/1972  Beyer et al. ........... 340/347 DD
3,946,379  3/1976  Lippman ............... 340/347 DD
4,402,078  8/1983  Athenes et al. ............. 364/900
4,447,804  5/1984  Allen .................. 340/347 DD Primary Examiner—Archie E. Williams, Jr.
Assistant Examiner—Lawrence E. Anderson
Attorney, Agent, or Firm—Hill, Van Santen, Steadman & Simpson

[57] ABSTRACT

For receiving or transmitting binary signals appearing serially on a plurality of lines to and from a processing device containing a microcomputer or microprocessor, the signal receiving lines carrying the serially appearing binary signals are connected via individual flip-flops to the input side of the microcomputer or microprocessor and signal output lines are connected via individual flip-flops to the output of the microcomputer or microprocessor. In the processing device, the serially appearing binary signals are received into memories or registers as parallel signals for processing and, after a prescribed plurality has been received, are forwarded to the receiving registers for subsequent processing. The processed parallel signals are then reconverted into serial signals for signal transmission.

3 Claims, 1 Drawing Figure

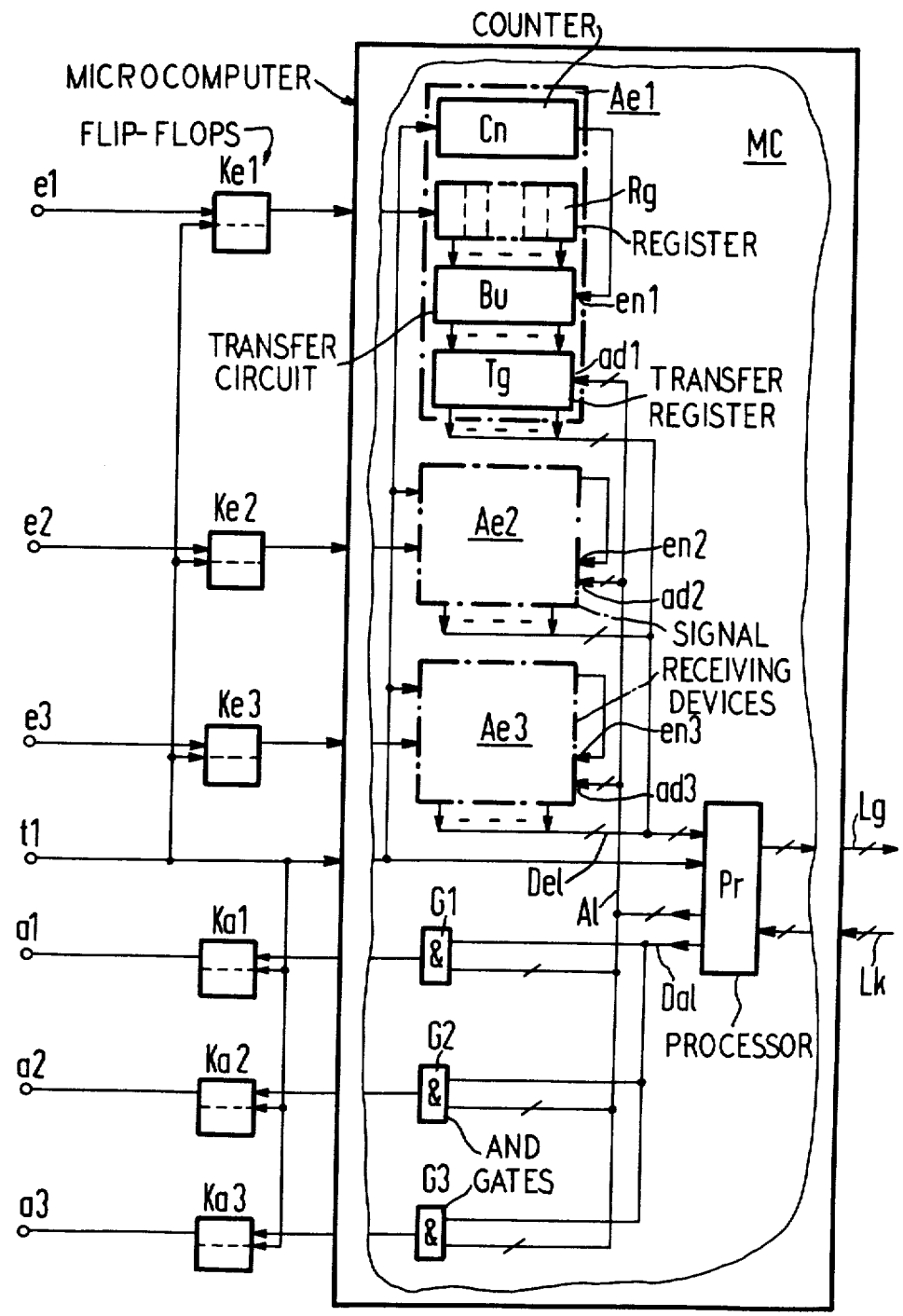

CIRCUIT ARRANGEMENT FOR RECEIVING AND/OR TRANSMITTING BINARY SIGNALS SERIALLY APPEARING ON THE PLURALITY OF LINES TO AND FROM A PROCESSING DEVICE CONTAINING A MICRO-COMPUTER OR MICROPROCESSOR

CROSS REFERENCE TO RELATED APPLICATIONS

This application is related to an application Ser. No. 741,172 filed June 4, 1985 and an application Ser. No. 740,977 filed June 4, 1985.

BACKGROUND OF THE INVENTION

1. Field of the Invention

The present invention relates to a circuit arrangement for receiving binary signals serially appearing on a plurality of signal receiving lines for processing the binary signals in the form of parallel signals respectively encompassing a prescribed plurality of bits and/or for the transmission of serially appearing binary signals by way of individual signal output lines after processing of the parallel signals encompassing the prescribed plurality of bits, to and from a processing device containing a microcomputer or a microprocessor which is connected at its input to the signal receiving lines and its output to the signal output lines by way of signal receiving and, respectively, signal transmitting devices.

2. Description of the Prior Art

The microcomputers or microprocessors currently conventionally employed in processing devices are designed such that they are capable of processing binary signals in the form of parallel signals. When a serial data stream is to be received or transmitted, separate interface modules are connected between the corresponding receiving lines or, respectively, transmission lines and the microcomputer or microprocessor. Such an interface module is, for example, a universal synchronous-/asynchronous transmitter/receiver module which is known in the art as an USART module. Such an interface module forms the microcomputer or microprocessor connected thereto when it can receive a new parallel signal or, respectively, character for transmission or can transmit such a character or parallel signal to the microcomputer or microprocessor. Binary signals which are supplied and forwarded by way of a plurality of lines designed for serial signal transmission can in fact be processed in this manner with the assistance of a microcomputer or microprocessor. It is thereby disadvantageous, however, that the expense connected with offering such interface modules is relatively high. Also added thereto is that the costs of such interface modules are on the order of magnitude of that of the microprocessors.

SUMMARY OF THE INVENTION

The object of the invention, accordingly, is to provide a circuit arrangement of the type initially set forth above, to acquire binary signals appearing serially on a plurality of receiving lines with different phase positions of their word boundaries simultaneously for processing by the microcomputer or microprocessor with a relatively low circuit technical expense or, respectively, to transmit parallel signals, multiply offered in the microcomputer or microprocessor, in the form of serially appearing binary signals simultaneously by way of a plurality of transmission lines.

The above object is achieved, according to the present invention, in a circuit arrangement of the type set forth above which is particularly charaterized in that the signal receiving devices are formed by flip-flop elements individually associated with the signal receiving lines, these flip-flop elements, clock controlled, receiving the bits appearing on the individual receiving lines and allowing the appertaining bits to be output to the input of a clock-controlled microcomputer or microprocessor. The arrangement is further characterized in that the input of the microcomputer or microprocessor has one or more internal memories or registers assigned thereto for clock-controlled collecting in individual memory or register cells of a defined plurality of serially appearing bits prescribed in terms of their sequence. The arrangement is further characterized in that the bits collected in such a manner are forwarded, after the defined plurality of bits has been received, to an appertaining input register for further processing. The arrangement is also characterized in that the signal transmission devices are formed by individual clock controlled flip-flop elements which are respectively connected at their outputs directly to the individual signal output lines and which, at their inputs, receive the bits serially offered from the output of the microcomputer or microprocessor, the bits being output from individual memory or register cells of an internal memory or, respectively, register which receives parallel signals supplied thereto in response to corresponding processing operations.

A circuit arrangement constructed in accordance with the invention offers the advantage that one can make due with a particularly low circuit technical expense in order to be able to accept binary signals appearing serially on a plurality of receiving lines with different phase positions of their word boundaries for a processing device containing a microcomputer or microprocessor which is only capable of processing parallel signals and/or of being able to output binary signals serially from the processing device by way of a plurality of transmission lines. According to the invention, therefore, one makes due with simple trigger circuits for the signal receiving devices and for the signal transmitting devices. The use of relatively involved interface modules as are usually employed in conjunction with microcomputers or microprocessors can therefore be eliminated.

Advantageously, the flip-flop elements forming the signal transmission devices have their signal inputs connected to individual outputs of the microcomputer or microprocessor, these being respectively individually connectible to the output memory or output register by way of individual activation. The advantage of a particulalrly low circuit technical expense thereby derives for the connection of signal transmission devices to the microcomputer or micrprocessor.

A selection circuit connected to the outputs of the flip-flop elements forming the signal receiving devices is preferably formed by a multiplexer which, controlled by a control circuit, respectively actively connects only one of the flip-flop elements to the input of the microcomputer or microprocessor. Thereby deriving is the advantage of a relatively low circuit technical expense for the connection of the individual signal receiving device to the microcomputer or microprocessor.

BRIEF DESCRIPTION OF THE DRAWING

Other objects, features and advantages of the invention, its organization, construction and operation will be best understood from the following detailed description, taken in conjunction with the accompanying drawing on which there is a single figure showing a schematic representation of a circuit arrangement constructed in accordance with the present invention.

DESCRIPTION OF THE PREFERRED EMBODIMENTS

Referring to the drawing, a circuit arrangement constructed in accordance with the invention comprises a plurality of signal receiving lines, namely three signal receiving lines e1, e2, e3 in the present case, and a plurality of signal output lines, namely three signal output lines a1, a2, and a3 in the present case. The individual bits of the binary signals forming the data words or, respectively, signals are serially transmitted with one and the same frequency by way of all lines which can be data lines corresponding to the CCITT recommendation X.21. The individual word boundaries can, however, appear with different phase positions. In the present case, the signal receiving lines e1–e3 have signal receiving devices formed by individual flip-flop elements respectively connected thereto. The flip-flop element Ke1 belongs to the signal receiving line e1; the flip-flop element Ke2 belongs to the signal receiving line e2; and the flip-flop element Ke3 belongs to the signal receiving line e3. These flip-flop elements are clock-controlled trigger circuits which have their clock inputs connected in common to a clock terminal t1 which supplies the bit clock and have their signal inputs connected to the respective receiving lines e1, e2 and e3.

The signal output lines a1, a2, a3 have individual signal transmission devices in the form of individual flip-flop elements Ka1, Ka2, Ka3 belonging thereto. The appertaining signal output lines are thereby connected to the outputs of the flip-flop elements. These flip-flop elements are likewise clock-controlled trigger circuits which have their clock inputs connected in common to the afore-mentioned clock terminal t1. The flip-flop elements Ka1, Ka2, Ka3 have their signal inputs connected to separate outputs of a microcomputer or microprocessor MC which belongs to a processing device.

The microcomputer or microprocessor MC has separate inputs connected to the outputs of the flip-flop elements Ke1, Ke2, Ke3 which form the aforementioned signal receiving devices.

The latter outputs and inputs of the microcomputer or microprocessor MC can be a respective separate connection (port) of the microcomputer or microprocessor MC. However, it is also possible to respectively employ only a single terminal as an output or, respectively, input, namely a single terminal of the data terminals of a microcomputer or microprocessor generally available for a data signal transmission. In this case, a multiplexer (not shown on the drawing) between the trigger circuits and the microcomputer or microprocessor in both transmission directions would undertake the required conversion.

With respect to a microcomputer or microprocessor MC shown on the drawing and belonging to a processing device, a central processor Pr is shown, this likewise being capable of being connected to the clock line t1 for the bit clock and having parallel inputs and outputs connected to internal registers Rg belonging to signal receiving devices Ae1–Ae3. Of the signal receiving devices which can be assumed to be present in a plurality corresponding to the plurality of flip-flop elements Ke1–Ke3, only the signal receiving device Ae1 is illustrated in greater detail in terms of its structure. In addition to the register Rg, which also be formed by an internal memory of the microcomputer, it comprises a counter Cn which is supplied at its input with the bit clock from the bit clock terminal t1 and which counts the pulses appearing thereat. Inputs of a transfer circuit Bu which, for example, may be formed by a plurality of AND gates are connected to the outputs of the register stages of the register Rg. An enable input en1 of this transfer circuit Bu is connected to the output of the counter Cn. The transfer circuit Bu has its outputs connected to inputs of a transfer register which has its outputs connected to a data bus line De1 which may comprise a plurality of individual lines, for example, eight individual lines. Corresponding outputs of all signal receiving devices Ae1–Ae3 are, moreover, connected to the data bus line De1.

The counter Cn of the signal receiving device Ae1 counts the number of bits serially written into the register Rg. After it has reached a prescribed, specific plurality of, for example, eight bits, it emits an enable control signal to the transfer circuit Bu. The transfer circuit Bu therefore allows the contents of the register Rg to be transferred into the transfer register Tg. Therefore, the bits previously collected in the register Rg in the prescribed, specific plurality, are now available in the transfer register Tg for further processing while further bits can be collected in the register Rg. This processing must occur before further bits are supplied to the trasnfer register Tg.

Operations which correspond entirely to the operations set forth above sequence in the other signal receiving devices Ae2, Ae3. With respect to these signal receiving devices, only the enabling inputs en2 and en3 with their enable signal connections and the connections at the inputs are illustrated on the drawing.

The data bus line De1 to which the outputs of all signal receiving devices Ae1–Ae3 are connected, are connected to the inputs of the processor Pr. The processor Pr is capable of receiving signals which appear by way of the data bus line De1, for example, signals comprising eight bits. In order to affect this acceptance, the individual signal receiving devices Ae1, Ae2, Ae3 must be separately selected or, respectively, addressed. This occurs proceeding from the processing Pr by way of a separate address bus line A1 to which the address inputs ad1, ad2, ad3 of all signal receiving devices ae1, ae2 and ae3 are connected.

The arrangement may thereby be undertaken such that respectively only one of the signal receiving devices Ae1, Ae2, Ae3 is addressed by an address appearing on the address bus line A1. This means that only one of the transfer registers corresponding to the transfer register Tg is selected for active signal emission.

Separate logic elements, in particular AND gates G1, G2, G3 have their inputs connected to the address bus line A1. The arrangement may thereby be undertaken such that these logic elements formed by AND gates and comprising a plurality of inputs are capable of responding to different addresses. It is thereby possible that each of these logic elements corresponds to an address which also leads to an addressing of one of the signal receiving devices Ae1-Ae3.

The logic elements G1, G2, G3 have further inputs connected in common to the output of a signal output line Da1 of the processor Pr. It is assumed that the signal bits appear serially on the line Da1. Since the processor Pr is only capable of outputting parallel signals, a register serving for a parallel-to-serial conversion is also included toward the input side of the respective logic element G1, G2, G3, in particular in accordance with register Rg.

The outputs of the logic elements G1, G2, G3 are connected to signal inputs of respective flip-flops Ka1, Ka2 and Ka3. These flip-flops have clock inputs connected in common to the aforementioned clock terminal t1. The flip-flops Ka1, Ka2 and Ka3 have their signal outputs connected to signal output lines, or respectively, terminals a1, a2, a3.

The processor Pr, which may comprise the arithmetic unit normally present in a microprocessor, is connected to further lines Lg, Lk by way of which parallel signals can be transmitted or received. It should be pointed out that the lines respectively marked on the drawing by a slash or parallel lines or bus lines which may respectively comprise a plurality of individual lines such as, for example, respectively eight individual lines.

The circuit structure considered above and shown on the drawing assures that the binary signals appearing on the signal receiving lines e1, e2, e3 with different phase positions, these binary signals all appearing with the same frequency in accordance with the assumption, are accepted clock-controlled into the appertaining signal receiving devices Ae1-Ae3 without signal loss occurring. The process and the transmission of the binary signals is likewise guaranteed by the clock-controlled transfer of the data signal bits previously collected in the individual signal receiving devices and subsequently offered in the receiving registers thereof, being guaranteed by the processor Pr. The clock control of the processor Pr and, therefore, of the overall microprocessor or, respectively, microcomputer MC occurs at a control input which may be a matter of a standard control input or interrupt input of the microcomputer or microprocessor MC.

In conclusion, it should also be pointed out that, according to the invention, the signals or signal groups appearing on a plurality or on all of the existing signal receiving lines can be processed and the microprocessor or microcomputer MC in common, i.e. in combination with one another without a given time relationship between the appertaining signals being lost.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for receiving and processing binary signals appearing serially on a plurality of signal receiving lines and transmitting the processed signals as serially appearing binary signals by way of a plurality of signal output lines, the serial signals comprising a predetermined number of bits, comprising:
   a plurality of first clock-controlled flip-flops each connected to a respective signal receiving line;
   a plurality of second flip-flops each connected to a respective signal output line;
   a plurality of selectively operable switches each including a plurality of inputs and each including a output connected to a respective second flip-flop;
   a plurality of signal receiving devices each connected to a respective first flip-flop and each comprising
      a clock-controlled counter including an output for carrying an enable signal upon reaching a predetermined count,
      a register connected to the respective first flip-flop for receiving the clocked end bits, and
      a transfer circuit connected to said register and including an enable input connected to said output of said counter;
   a transfer register connected to said transfer circuit and including an address input;
   a bus system including an address bus connected to each of said address inputs of said transfer registers and to some of said inputs of said switches, an incoming data bus connected to each of said transfer registers, and an output data bus connected to some of said inputs of each of said switches;
   processing means connected to said address bus, to said incoming data bus and to said output data bus, said processor operable to select the signal receiving lines via the respective signal transfer registers, to select the signal output lines via the respective switches, and to receive and process the incoming data and transmit the processed data; and
   each of said flip-flops and said processor comprising a common clock input for synchronous operation of said arrangement.

2. The circuit arrangement of claim 1, wherein: each of said switches comprises a gate circuit.

3. The circuit arrangement of claim 1, wherein: each of said switches comprises an AND gate.

* * * * *